(12) United States Patent
Young et al.

(10) Patent No.: US 6,979,021 B2
(45) Date of Patent: Dec. 27, 2005

(54) INTEGRAL INITIATOR ASSEMBLY FOR USE IN INFLATOR DEVICES

(75) Inventors: Anthony M. Young, Malad, ID (US); Thomas E. Funk, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 58 days.

(21) Appl. No.: 10/636,344

(22) Filed: Aug. 7, 2003

(65) Prior Publication Data

US 2005/0029787 A1    Feb. 10, 2005

(51) Int. Cl.$^7$ .............................................. B60R 21/26
(52) U.S. Cl. ...................................... 280/737; 280/741
(58) Field of Search ............................... 280/737, 736, 280/741, 742; 102/202, 202.5, 202.7, 202.9, 102/202.14, 202.12

(56) References Cited

U.S. PATENT DOCUMENTS

| | | | |
|---|---|---|---|
| 3,803,374 A | | 4/1974 | Delgendre et al. |
| 5,487,559 A | * | 1/1996 | Headley ...................... 280/735 |
| 5,794,973 A | * | 8/1998 | O'Loughlin et al. ........ 280/737 |
| 5,803,493 A | | 9/1998 | Paxton et al. |
| 6,007,096 A | * | 12/1999 | Shirk et al. .................. 280/736 |
| 6,073,963 A | * | 6/2000 | Hamilton et al. ........... 280/741 |
| 6,244,622 B1 | * | 6/2001 | Al-Amin et al. ............ 280/737 |
| 6,244,623 B1 | | 6/2001 | Moore et al. |
| 6,295,935 B1 | * | 10/2001 | Swann et al. ................ 102/530 |
| 6,338,500 B1 | * | 1/2002 | Perotto ........................ 280/741 |
| 6,431,595 B1 | * | 8/2002 | Swann et al. ................ 280/736 |

FOREIGN PATENT DOCUMENTS

WO    WO 02/051674 A1    7/2002

* cited by examiner

Primary Examiner—Eric Culbreth
(74) Attorney, Agent, or Firm—Sally J. Brown

(57) ABSTRACT

An integral initiator assembly and an inflator device including the integral initiator assembly. The integral initiator assembly including a body having a first end including an opening. An initiator canister including a reactive charge and a conductive pin is joined to the body in discharge alignment with the first end opening by an injection-molded material. At least two gas exit holes are included in the body and positioned radially relative to a longitudinal axis of the initiator canister. The gas exit holes in gas flow communication with a gas flow space between an inside surface of the body and the initiator canister to allow inflation gas to exit the integral initiator assembly. A rupturable disk seals the opening of the first end. The integral initiator assembly is attached to the body at the first end over the sealed opening and filled with inflation gas to form an inflator device. Actuation of the reactive charge ruptures the rupturable disk and the pressurized inflation gas enters the gas flow space and exits through the gas exit holes.

21 Claims, 6 Drawing Sheets

INTEGRAL INITIATOR ASSEMBLY FOR USE IN INFLATOR DEVICES

BACKGROUND OF THE INVENTION

This invention relates generally to an initiator assembly for use in inflator devices. More specifically, the invention relates to an integral initiator assembly such as for use in the inflation of inflatable devices such as inflatable vehicle occupant restraint airbag cushions used in inflatable restraint systems.

It is well known to protect a vehicle occupant using a cushion or bag, e.g., an "airbag cushion," that is inflated or expanded with gas such as when the vehicle encounters sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

Many various inflator devices have been disclosed in the art for the inflating of one or more inflatable restraint system airbag cushions. One category of such inflator devices is often referred to as "compressed gas inflators" and refers to various inflators which contain a selected quantity of compressed gas. For example, one particular category of compressed gas inflator, commonly referred to as a "stored gas inflator," simply contains a quantity of a stored compressed gas which is selectively released to inflate an associated airbag cushion.

A second category of compressed gas inflator, commonly referred to as "hybrid inflators," typically supplies or provides inflation gas as a result of a combination of stored compressed gas with combustion products resulting from the combustion of a gas generating material.

Specific types of compressed gas inflator devices include those commonly referred to as "blow down" and those referred to as "direct opening" inflation systems. In a blow down inflation system, a pyrotechnic or other selected material is commonly burned or otherwise reacted to create a build-up of pressure within a compressed gas storage chamber such as to result in the rupture or release of inflation gas therefrom when the internal pressure reaches a predetermined level or range. For example, upon actuation of an initiator device, a gas generant material is heated resulting in the release of gas. The resulting increase in pressure ruptures a sealing disk, thereby releasing stored inflation gas. The released inflation gas exits the inflator device through exit holes previously blocked by the ruptured disk.

In contrast, in a direct opening type inflation system, compressed gas is commonly released as a result of the movement of a mechanical opening device such as an associated projectile or piston member. For example, the actuation of an initiator device in turn actuates gas generant material which produces gas. The increase in gas pressure causes a projectile to propel through a sealing disk, thereby releasing stored inflation gas. The released inflation gas exits the inflator device through exit holes previously blocked by the ruptured disk.

The prior art generally discloses both blow down and direct opening inflator devices beneficial for use in airbag installations. However, compressed gas inflators, such as blow down and direct opening inflators, typically require undesirably complicated and/or considerably multiple component assemblies which can undesirably increase manufacturing steps and costs. The need for such relatively complicated initiator assemblies and initiator assembly installations is often due to the utilization of a generally "standard" initiator canister being used in various inflator device configurations. Initiator assemblies known in the art generally adapt typically "standard" initiator canisters to be used in new inflator design configurations.

There is a need for a more simplified inflator device that can be more easily and inexpensively produced. Further, there is a need for a more simplified inflator device which can be used in various airbag installations and in various vehicular types. There is further also a need for a single inflator device design that can be easily configured as a blow down or direct opening inflator device.

SUMMARY OF THE INVENTION

A general object of the invention is to provide an improved inflation device through the use of an integral initiator assembly.

A more specific objective of the invention is to overcome one or more of the problems described above.

The general object of the invention can be attained, at least in part, through an integral initiator assembly that can be attached to a gas storage housing such as may have various configurations such as to provide various sized and shaped inflator devices. The integral initiator assembly of one embodiment of this invention includes a body having a first end including an opening, a second end opposite the first end and an inside surface. An initiator canister is joined to the body. The initiator canister includes a header body forming an eyelet and an initiator cap connected to the header body, thereby defining a charge chamber. The initiator cap has an outside surface, with at least a portion of the outside surface separated from the body inside surface by a gas flow space. The initiator canister has a longitudinal axis extending substantially perpendicular to the first end opening, and the initiator cap is in discharge alignment with the first end opening. A reactive charge is disposed within the charge chamber and a conductive pin is positioned within the eyelet in actuating communication with the reactive charge. The body has a thrust neutral gas exit area including at least two gas exit holes in the body positioned radially to the longitudinal axis of the initiator canister. The gas exit holes are in gas flow communication with the gas flow space to allow inflation gas to exit the gas exit holes.

The prior art generally fails to disclose an integral initiator assembly having a simplified, one-piece design which can be used with a gas storage housing such as may have various configurations to form an inflator device. Inflator devices known in the art generally include initiator assemblies having several components assembled through multiple production steps. Often, the relatively complicated initiator assemblies and initiator assembly installations, such as known in the art, are needed to adapt a generally "standard" initiator canister to various inflator device configurations.

The invention further comprehends an integral initiator assembly including a body having a first end including an opening, a second end opposite the first end and an inside surface. An initiator canister is joined to the body. The initiator canister includes a header body forming an eyelet and a metal initiator cap connected to the header body, thereby defining a charge chamber. The initiator cap has an outside surface with at least a portion of the outside surface separated from the body inside surface by a gas flow space. The initiator canister has a longitudinal axis extending substantially perpendicular to the first end opening, and the initiator cap is in discharge alignment with the first end opening. A reactive charge is disposed within the charge chamber and a conductive pin is positioned within the eyelet in actuating communication with the reactive charge. A thermoplastic injection-molded material surrounds at least a portion of the initiator canister and joins the initiator canister to the body to form an integral initiator assembly. The body has a thrust neutral gas exit area including at least two gas exit holes in the body positioned radially to the longitudinal axis of the initiator canister. The gas exit holes are in gas flow communication with the gas flow space to allow inflation gas to exit the gas exit holes.

The invention still further comprehends an inflator device including an integral initiator assembly including a body having a first end including an opening, a second end opposite the first end and an inside surface. An initiator canister is joined to the body. The initiator canister includes a header body forming an eyelet and an initiator cap connected to the header body, thereby defining a charge chamber.

The initiator cap has an outside surface with at least a portion of the outside surface separated from the body inside surface by a gas flow space. The initiator canister has a longitudinal axis extending substantially perpendicular to the first end opening and the initiator cap is in discharge alignment with the first end opening. A reactive charge is disposed within the charge chamber and a conductive pin is positioned within the eyelet in actuating communication with the reactive charge. An injection-molded material surrounds at least a portion of the initiator canister and joins the initiator canister to the body to form an integral initiator assembly. The body has a thrust neutral gas exit area including at least two gas exit holes in the body positioned radially to the longitudinal axis of the initiator canister. The gas exit holes are in gas flow communication with the gas flow space to allow inflation gas to exit the gas exit holes. A rupturable disk seals the opening at the body first end. The inflation device further includes a gas storage housing attached to the body. The gas storage housing in combination with the rupturable disk forms a gas storage chamber. Upon rupture of the rupturable disk upon actuation of the reactive charge, the inflation gas exits the inflation device through the gas exit holes.

Other objects and advantages will be apparent to those skilled in the art from the following detailed description taken in conjunction with the appended claims and drawings.

DETAILED DESCRIPTION OF THE INVENTION

The present invention provides an initiator assembly, more particularly an integral initiator assembly, and an inflation device including the initiator assembly. An integral initiator assembly refers to an initiator assembly formed as a continuous unit. The integral initiator assembly of this invention provides a cost savings over production and assembly of prior art inflator devices as it yields desired inflation performance with one integral initiator assembly component which is more easily assembled into an inflator device, thereby reducing production steps and material costs as compared to typical prior art initiation assemblies.

Figure 1:
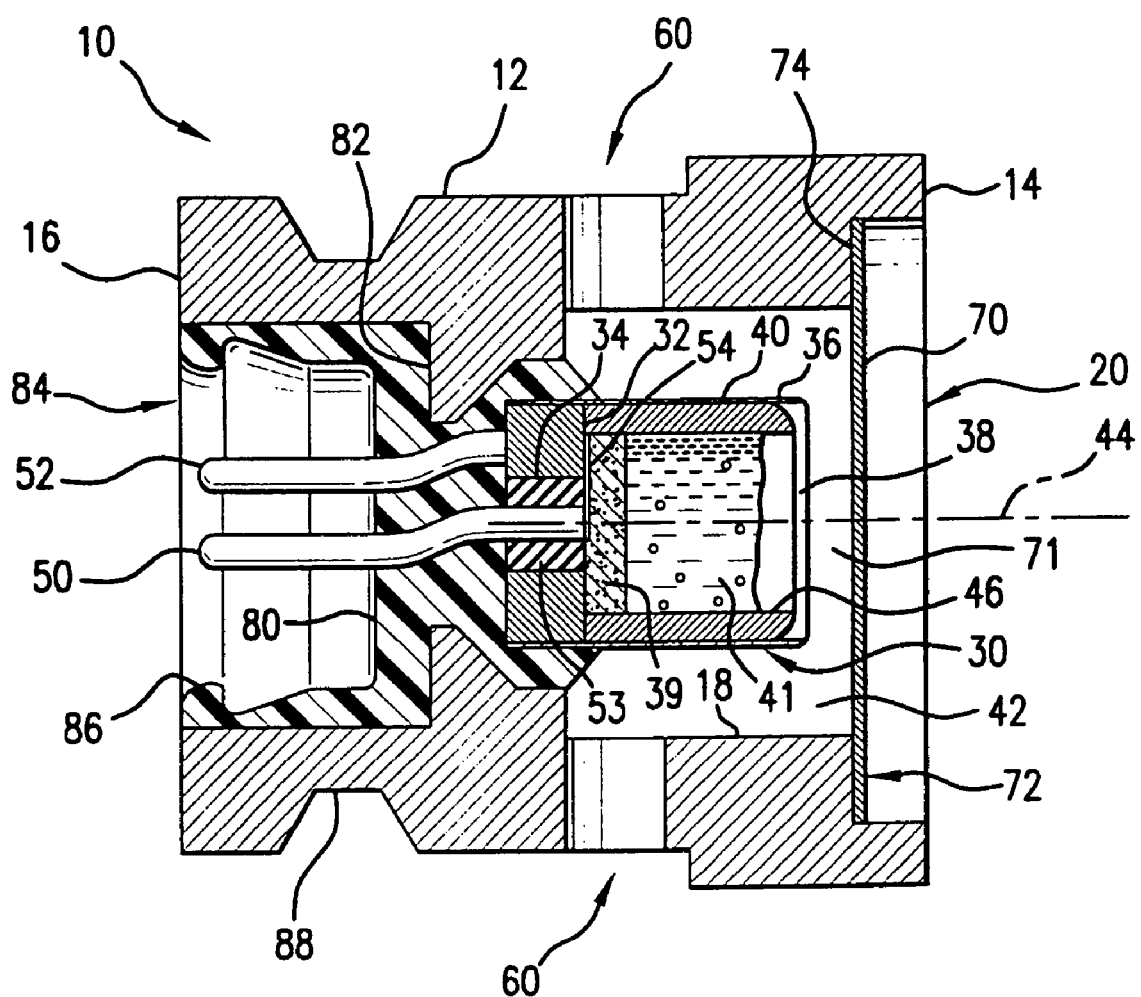
FIG. 1 shows a partial cross-sectional view of an integral initiator assembly in accordance with one preferred embodiment of the invention.

FIG. 1 illustrates an integral initiator assembly in accordance with a one embodiment of the invention and generally designated with the reference numeral 10. The integral initiator assembly 10 can be used with various inflatable restraint installations including driver, passenger and side impact inflatable restraint installations, for example. It will be understood by those skilled in the art and guided by the teachings herein provided that the invention has general applicability to inflatable restraint installations for various automotive vehicles including vans, pick-up trucks, and particularly automobiles.

The integral initiator assembly 10 includes a body 12 having a first end 14 and a second end 16 opposite the first end 14. The body 12 has an inside surface 18, shown in FIG. 1 as extending through the body 12 from the first end 14 to the second end 16. The first end 14 includes an opening 20. As will be appreciated by those skilled in the art, the body 12 can include various sizes, shapes and materials of construction, such as metal, depending on the desired configuration of the inflation restraint system in which the integral initiator assembly 10 is used. The body 12 shown in FIG. 1 has a generally cylindrical shape.

An initiator canister 30 is joined to the body 12. The initiator canister 30 includes a header body 32. The header body 32 forms an eyelet 34. An initiator cap 36 is connected to the header body 32, thereby defining a charge chamber 38. The initiator cap 36 has an outside surface 40, with at least a portion of the outside surface 40 separated from the inside surface 18 of the body 12. The separation of the outside surface 40 of the initiator cap 36 creates a gas flow space 42 between the initiator canister 30 and the body 12. The charge chamber 38 includes at least one actuatable reactive charge material 39 which, upon actuation, will at least produce heat. In practice, actuation of the reactive charge 39 will generally desirably serve to rupture the initiator cap 36. The initiator cap 36 is desirably made of materials known in the art, such as metal, and formed such that it can be ruptured, such as by the discharged reaction products of the actuated reactive charge 39. The initiator cap 36 can be ruptured by the reactive charge 39 directly, for example, by the exothermic reaction of the reactive charge 39 within the charge chamber 38, or indirectly, for example, by a projectile propelled through the initiator cap 36 by a force emanating from the reacting reactive charge 39.

The initiator canister 30 is in discharge alignment with the body opening 20. The initiator canister 30 is in "discharge alignment" when disposed within the body 12 such that upon actuation of the reactive charge 39 within the charge chamber 38, the resulting discharged reaction products of the exothermic reaction of actuated reactive charge 39 are at least in part directed toward the body opening 12. In one preferred embodiment the reactive charge 39 is a pyrotechnic charge, which upon actuation, reacts to at least produce heat, and desirably may also form gas as well. The reaction of the reactive charge 39 creates a discharge of reaction products which is directed from the charge chamber 38 toward the first end opening 20. As shown in FIG. 1, the initiator canister 30 is positioned within the body 12 such that a longitudinal axis 44, which extends through the center of the header body 32 and the initiator cap 36, of the initiator canister 30 is substantially perpendicular to the first end opening 20. The initiator canister 30 includes a charge holder 46 which is used to direct and/or focus the discharged reaction products from the actuated reactive charge 39 toward the first end opening 20.

Typically, known inflator initiators include at least one electrical terminal, often a conductive pin, for electrical contact with an associated electrical connector and such as designed to properly receive an electrical signal therefrom. The integral initiator assembly of this invention includes at least one electrical terminal, more particularly at least one conductive pin. In the integral initiator assembly 10 of FIG. 1, the initiator canister 30 includes a pair of electrical terminals, shown as electrical conductive pins 50 and 52, respectively, in actuating communication with the reactive charge 39. The electrical conductive pins 50 and 52 are in actuating communication with the reactive charge 39. The electrical conductive pins 50 and 52 are in "actuating communication" with the reactive charge 39 when the conductive pins 50 and 52 are able to initiate reaction of the reactive charge 39 upon receiving an electrical signal from an associated electrical connector. As shown in FIG. 1, the first conductive pin 50 is attached to the initiator canister 30 with one end positioned within the eyelet 34 and an opposite end toward the second end 16. An insulating material 53 within the eyelet 34 can be used to separate and insulate the first conductive pin from the header body 32. The second conductive pin 52, separate from the first conductive pin 50, is attached to the header body 32. As known in the art, a bridgewire 54 can be used to connect the conductive pin 50 to the header body 32 when the insulating material 53 is present, thereby closing a circuit between the conductive pin 50 and the conductive pin 52. As will be appreciated, various electrical terminal configurations known in the art can be used with the integral initiator assembly of this invention.

As will be appreciated by those skilled in the art, the reactive charge 39 can include one or more known reactive charge materials which can be actuated by an electrical current introduced through conductive pins 50 and 52 described below. The reactive charge 39 can include a fuel slurry and an oxidizer slurry mixed together and positioned in the charge chamber 38. Examples of reactive charges known in the art and useful in the integral initiator assembly 10 include mixtures including zirconium and potassium perchlorate (ZPP). In one embodiment of this invention, the reactive charge 39 is a powder and at least a portion of the powder reactive charge 39 is packed around the bridgewire 54 to maintain the reactive charge 39 in sufficient actuating contact with the bridgewire 54.

In one embodiment of this invention, as shown in FIG. 1, a gas generant material 41 is contained within the charge chamber 38 in addition to the reactive charge 39. The gas generant material 41 is actuated by the reaction of the reactive charge 39, and not directly by the electrical current from the conductive pins 50 and 52, to produce a gas. Gas generant materials for use in the practice of the invention can suitably take various forms including wafer, pellet and grain forms, for example. Preferred gas generant materials for use in the practice of the invention can desirably include or contain a combustible fuel and oxidizer combination. In accordance with one preferred embodiment of the invention, the fuel is preferably composed of an organic compound that is rich in nitrogen and oxygen content as such fuel materials can desirably reduce the amount of oxidizer required for combustion thereof. Specific examples of materials useful as such fuels include but are not limited to: guanidine nitrate, aminoguanidine nitrate, diamminoguanidine nitrate, triaiminoguanidine nitrate, nitroguanidine, and nitrotriazal one; tetrazoles, bitetrazoles, and triazoles, and combinations thereof. In addition, transition metal nitrate, chlorate, or perchlorate complexes of organic compounds may be used as fuels. Specific examples of preferred oxidizer component materials for use in the practice of the invention include but are not limited to one or more of the following materials: ammonium nitrate, ammonium perchlorate, transition metal amine nitrates, chlorates, and perchlorates; alkaline earth metal peroxides, nitrates, perchlorates, and chlorates; transition metal peroxides, nitrates, and perchlorates and alkali metal nitrates, chlorates, and perchlorates. In one embodiment of this invention, the reactive charge 39 is zirconium and potassium perchlorate (ZPP) and the gas generant material 41 is titanium hydride potassium perchlorate (THPP).

The body 12 includes at least two gas exit holes 60. The gas exit holes 60 are positioned within the body 12 radially relative to the longitudinal axis of the initiator canister 30. The gas exit holes 60 are in gas flow communication with the gas flow space 42, thereby allowing inflation gas in the gas flow space 42 to exit the integral initiator assembly through the gas exit holes 60.

The position of the gas exit holes 60 provide a thrust neutral gas exit area. As will be appreciated by one skilled in the art, a thrust neutral gas exit area is generally advantageous for inflation restraint system performance, as such spacing may serve to minimize or avoid undesired concentration or focusing of the impingement of exiting inflation gas. The incorporation and use of a thrust neutral gas exit area can also serve to reduce the forces transferred to inflator mounting hardware during actuation, and therefore can reduce the cost of such mounting hardware, particularly as the forces typically or normally exerted against such hardware can be significantly reduced or minimized. In FIG. 1, the two gas exit holes 60 are positioned across from each other. When inflation gas exits the two gas exit holes 60, the thrust force resulting from the exiting inflation gas from one of the gas exit holes 60 is neutralized by the counter thrust force resulting from the inflation gas exiting the opposite gas exit hole 60, thereby providing a thrust neutral gas exit area of the integral initiator assembly 10.

Figure 3:
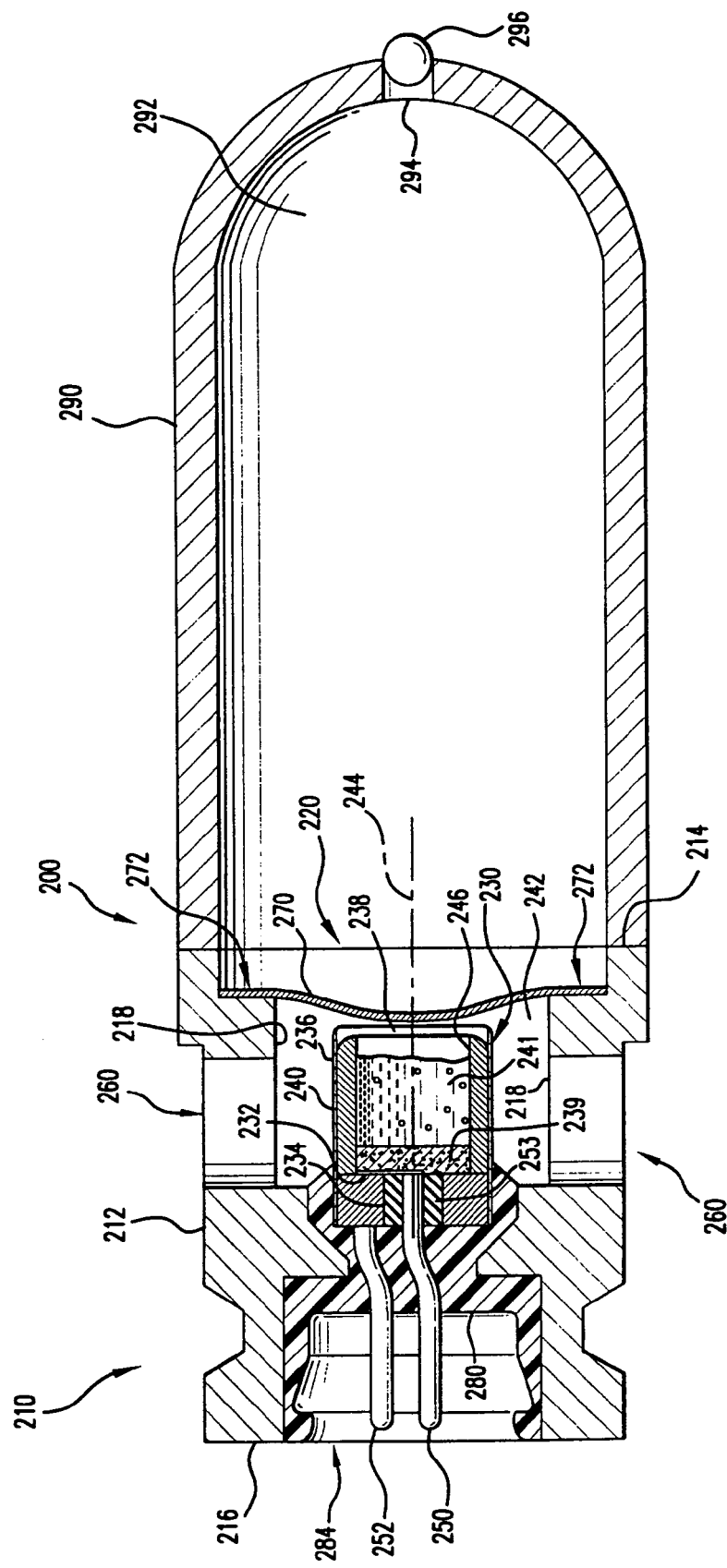
FIG. 3 shows a partial cross-sectional view of an inflator device in accordance with one preferred embodiment of the invention.
Figure 4:
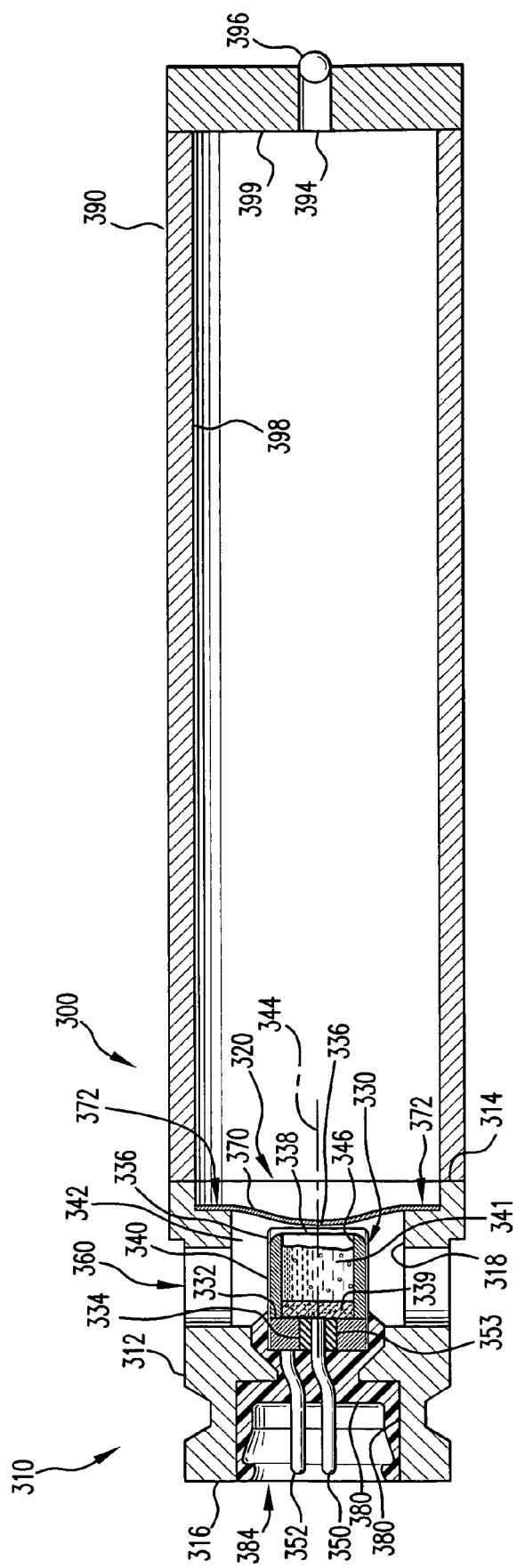
FIG. 4 shows a partial cross-sectional view of an inflator device in accordance with another preferred embodiment of the invention.

A rupturable disk 70 is attached to the body 12 at the body first end 14. The rupturable disk 70 seals the opening 20 at the first end 14. As shown in FIGS. 3 and 4 and described below, the rupturable disk seals inflation gas within a gas storage housing attached to the body. The rupturable disk 70 is desirably in the form of a thin disk such as fabricated or formed of a metal material such as, for example, Inconel 600 or Inconel 625. Disk thickness is generally a function of the diameter of the unsupported portion of the disk and the gas fill pressure. In practice, such a disk may typically have a thickness in the range of about 0.005 inch (about 0.127 mm) to about 0.025 inch (about 0.064 mm), for example. The rupturable disk 70 is desirably circular and has its periphery secured to the body inner wall 18. In one embodiment of this invention, the body 12 includes a stepped inner rim 72 at the first end 14. As shown in FIG. 1, the rupturable disk 70 is attached to a surface 74 of the stepped inner rim 72. As will be appreciated by those skilled in the art and following the teachings herein provided, the rupturable disk 70 can be attached to the body 12 without including a stepped inner rim 72. The placement of the rupturable disk 70 with respect to the initiator canister 30, i.e., the distance between the initiator cap 36 and the rupturable disk 70, can vary and is such that the rupturable disk 70 can be ruptured upon actuation of the reactive charge 39 within the charge chamber 38. The rupturable disk 70 is ruptured by the heat and/or force from the exothermic reaction resulting from the actuation of the reactive charge 39 and/or the gas generant material 41. Including a gas generant material 41 in the charge chamber 38, in addition to the reactive charge 39, further provides an increase in pressure that can provide a more efficient rupture of the rupturable disk 70. The inclusion of a small spacing 71 between the initiator cap 36 and the rupturable disk 70 can be beneficial as the rupturable disk can curve or flex toward the initiator cap due to pressurized inflation gas sealed in a gas storage chamber, such as described below, by the rupturable disk.

It will be appreciated that the rupturable disk can, if desired, include a score such as to facilitate the desired opening of the rupturable disk. More specifically, the inclusion of such a score can be helpful in more specifically locating or positioning the site at which the rupturable disk will initially open. As will be appreciated, such rupturable disk scoring can take various forms such as known in the art. For example, the rupturable disk may include a score in the form of a cross or a circle, such as may be desired or particularly suited for a specific installation. Further, such a score may take the form of an indentation, marking or otherwise reduction in the thickness of the burst disk at selected area or portion thereof, as is known in the art.

In one embodiment of this invention, an interface portion 80 joins the initiator canister 30 to the body 12 to form the integral initiator assembly 10. In one embodiment of this invention, the interface portion 80 can be applied to the integral initiator assembly 10 by an injection molding process in which a liquid or flowable material is disposed within the body 12 and about portions of the initiator canister 30.

When the injection molded interface portion 80 solidifies, the initiator canister 30 is fixedly held to the interface portion 80 and the interface portion 80 is fixedly held to the body 12. As shown in FIG. 1, the body 12 includes shoulders 82 extending from the inside surface 18. The body shoulders 82 provide additional support for the connection of the interface portion 80 and the body 12. Alternative means, such as other melt bonding techniques, can alternatively or also be used to join the initiator canister to or with the body to form the integral initiator assembly. As used herein, melt bonding generally refers to methods of joining the initiator canister to or with the body by melting and subsequent cooling of either or both the initiator canister, the body, a component of either or each of the initiator canister or the body or an added material.

Those skilled in the art and guided by the teachings herein provided will appreciate that the interface portion 80 can be formed from a variety of materials including various thermoplastic or similar compositions such as known in the art and such as are conducive to processing via injection molding and such as are well-suited for providing electrical insulation. In general, properties or conditions important in the selection of an appropriate material for use in such an application include: tensile and impact strength, electrical insulating properties or characteristics, as well as having a melt temperature lower than the autoignition temperature of the associated reactive charge material. Glass-reinforced nylon is a preferred material for use in forming the interface portion 80. Examples of other useful or suitable materials for use in such applications include glass-reinforced polyester and glass-reinforced polyetherimide. Moreover, those skilled in the art and guided by the teachings herein provided will appreciate that other materials, e.g., other thermoplastic materials such as known in the art, may also be suitable and used in the practice of the invention in various embodiments.

As shown in FIG. 1, the body 12 includes a mating interface 84 at the body second end 16. The mating interface 84 contains at least a portion of the conductive pins 50 and 52. The mating interface 84 allows connection of the integral initiator assembly 10 to an associated electrical connector (not shown). The mating interface 84 can be adapted to match various configurations of electrical connectors by desirable shaping of the interface portion 80. For example, the interface portion 80 of the integral initiator assembly 10 shown in FIG. 1 covers an area of inside surface 18 at the second end 16 and defines a mating interface 84 that is shaped to correspond to a matched electrical connector (not shown). The interface portion 80 can be formed to include retaining shoulders 86 that hold the electrical connector securely in and to the mating interface 84. A crimp groove 88 can be included on the outside surface 40 of the body 12 to secure the integral initiator assembly to an airbag assembly or a vehicle.

Figure 2:
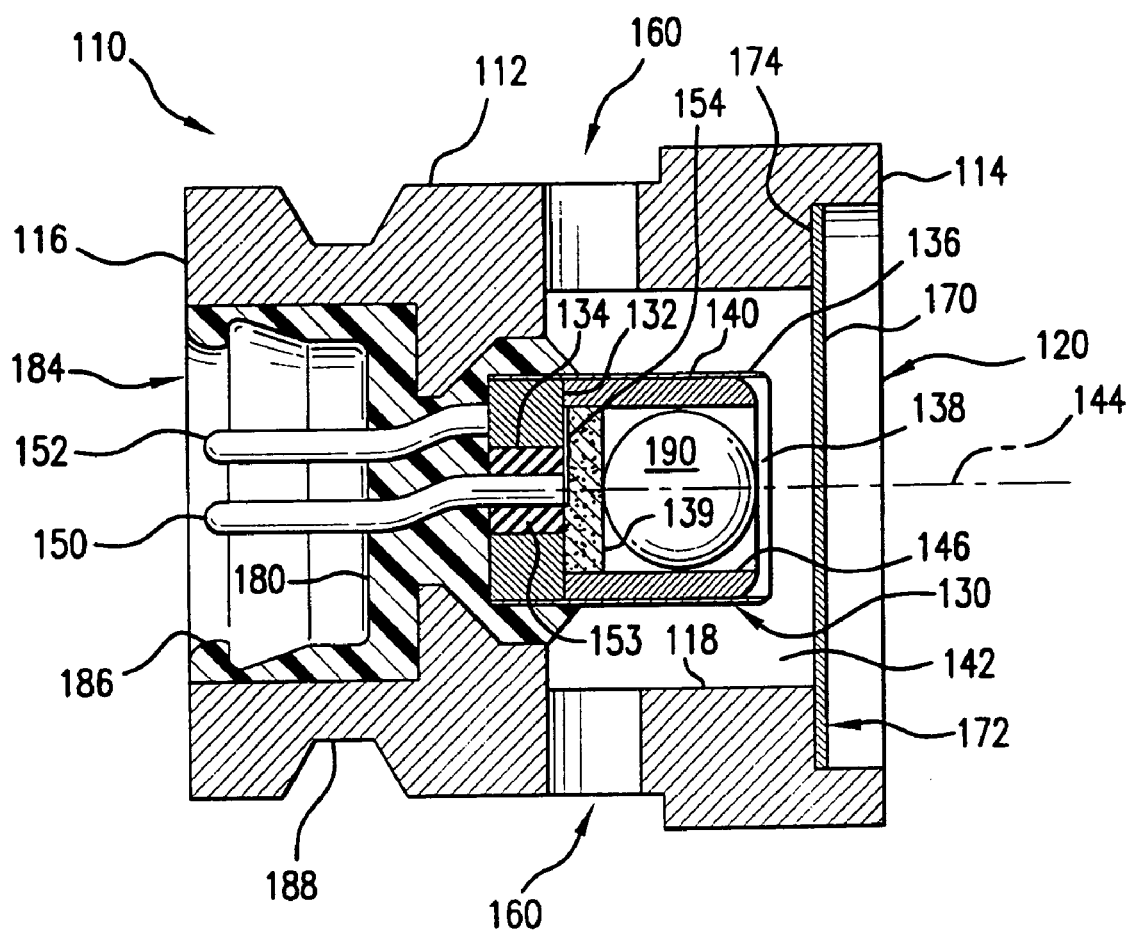
FIG. 2 shows a partial cross-sectional view of an integral initiator assembly in accordance with another preferred embodiment of the invention.

FIG. 2 illustrates an integral initiator assembly in accordance with another embodiment of the invention and generally designated with the reference numeral 110. The integral initiator assembly 110 includes components as described above for the integral initiator assembly 10 shown in FIG. 1, only with a projectile 190 within the charge chamber 138 in place of the gas generant material 41. The projectile 190 shown in FIG. 2 is generally spherically shaped and formed of solid metal, although one skilled in the art following the teachings herein described will understand that a projectile of various shape and material of construction can desirably be employed in the practice of this invention. The initiator cap 136 is in discharge alignment with the first end opening 120, and upon the exothermic reaction resulting from actuation of a reactive charge 139 by an electrical signal through conductive pins 150 and 152, the projectile 190 is propelled in the direction of the first end opening 120. A charge holder 146 directs the propelled projectile 190 in the desired direction. A charge chamber 138 includes an amount of reactive charge 139 sufficient to generate enough reaction force upon reaction to propel the projectile through an initiator cap 136 and a rupturable disk 170. The size, shape and material of construction of the projectile, the size, shape and material of construction of the rupturable disk and the initiator cap, the spacing between the projectile and the rupturable disk, and the reaction characteristics of the reactive charge are factors to be considered in determining the amount of reactive charge necessary to propel the projectile through the rupturable disk. A gas generant material, such as described above, can also be used within the charge chamber in addition to the reactive charge to provide sufficient force to propel the projectile through the rupturable disk.

The integral initiator assembly of this invention, such as shown in FIGS. 1 and 2, can be attached to a gas storage housing to form an inflator device, particularly for use in inflatable restraint installations. The gas storage housing can be attached to the body of the integral initiator assembly, preferably at the first end and over the opening at the first end. The gas storage housing has an opening at the housing end connected to the integral initiator assembly body which aligns with the body first end opening. The gas storage housing in combination with the rupturable disk over the first end opening encloses an inflation gas chamber for containing inflation gas.

FIG. 3 shows an inflator device 200 of one embodiment of this invention, such as useful in side, or "thorax," inflation restraint installations. The inflator device 200 includes an integral initiator assembly 210, such as the integral initiator assembly described above and shown in FIG. 1, attached to a gas storage housing 290. The integral initiator assembly 210 includes a body 212 having a first end 214 and a second end 216 opposite the first end 214. The body 212 has an inside surface 218. The first end 214 includes an opening 220. An initiator canister 230 is joined to the body 212. The initiator canister 230 includes a header body 232 forming an eyelet 234 containing insulating material 253. An initiator cap 236 is connected to the header body 232, thereby defining a charge chamber 238. The initiator cap 236 has an outside surface 240 with at least a portion of the outside surface 240 separated from the inside surface 218 of the body 212, thereby creating a gas flow space 242. At least one actuatable reactive charge 239 is disposed within the charge chamber 238, and, upon actuation by an electrical current through the conductive pins 250 and 252, the reactive charge 239 will at least produce heat. The reactive charge 239 can be any reactive charge material or reactive charge material combination described herein. A gas generant 241, such as described above, is also included within the charge chamber 238. In another, alternative embodiment, a projectile, such as described above with reference to FIG. 2, is included within the charge chamber.

The initiator canister 230 is in discharge alignment with the body opening 220. The initiator canister 230 includes a charge holder 246 which is used to direct and/or focus the discharged reaction products resulting from the exothermic reaction upon actuation of the reactive charge 239 toward the first end opening 220. The initiator canister 230 includes a pair of conductive pins 250 and 252, respectively, in actuating communication with the reactive charge 239.

The body 212 includes at least two gas exit holes 260 positioned radially relative to the longitudinal axis 244 of the initiator canister 230. The position of the gas exit holes 260 in the body 212 create a thrust neutral gas exit area. The gas exit holes 260 are in gas flow communication with the gas flow space 42, thereby allowing inflation gas in the gas flow space 242 to exit through the gas exit holes 260.

An interface portion 280 joins the initiator canister 230 to the body 212 to form the integral initiator assembly 210. The interface portion 280 can be formed of any interface portion material described above, such as an injection molded thermoplastic material. The body 212 includes a mating interface 284 at the body second end 216 containing at least a portion of the conductive pins 250 and 252.

The gas storage housing 290 is attached to the body 212 at the first end 214. The gas storage housing 290 is attached to the body 212 by methods such as are known in the art, such as welding, to create an airtight seal. A rupturable disk 270 is attached to the body 212 at the body first end 14. As shown in FIG. 3, the rupturable disk 270 is attached to a stepped inner rim 272. The rupturable disk 270 seals the opening 220 at the first end 214, as well as the opening at the end of the gas storage housing 290. By sealing the first end opening 220 and the opening of the gas storage housing 290, the rupturable disk 270 in combination with the gas storage housing 290 forms a gas storage chamber 292. Thus, inflation gas within the gas storage housing 292 cannot enter the gas flow space 242 until the rupturable disk 270 is ruptured. The gas storage housing 290 can include a fill port 294, such as is known in the art, wherethrough materials, such as inflation gas, can be passed into the gas storage chamber 292. After the gas storage chamber 292 has been filled, the fill port 294 can be appropriately blocked or plugged, as is known, such as by a pin or ball 296. As will be appreciated, such a fill port, if included in the inflator device, can alternatively be placed or positioned in the gas storage housing 290 as may be desired and understood by those skilled in the art. Inflation gas for use in the inflator devices of this invention can include materials known in the art, and desirably includes inert materials such as one or more noble gases such as argon and helium, for example, as well as materials such as nitrogen and carbon dioxide which are essentially inert under such processing conditions, or various combinations thereof.

FIG. 4 shows another embodiment of an inflator device according to this invention, such as may desirably be employed in conjunction with curtain inflatable restraint installations, and generally designated by the reference numeral 300. The inflator device 300 includes an integral initiator assembly 310, such as the integral initiator assembly described above and shown in FIG. 1, attached to a gas storage housing 390. The integral initiator assembly 310 includes a body 312 having a first end 314 and a second end 316 opposite the first end 314. The body 312 has an inside surface 318. The first end 314 includes an opening 320. An initiator canister 330 is joined to the body 312. The initiator canister 330 includes a header body 332 forming an eyelet 334 containing insulating material 353. An initiator cap 336 is connected to the header body 332, defining a charge chamber 338. The initiator cap 336 has an outside surface 340 with at least a portion of the outside surface 340 separated from the inside surface 318 of the body 312, creating a gas flow space 342. At least one actuatable reactive charge 339 is disposed within the charge chamber 338 and, upon actuation by an electrical current through conductive pins 350 and 352, the reactive charge 339 will at least produce heat, and desirably some gas as well. The reactive charge 339 can be any reactive charge material described herein. A gas generant 341, such as described above, is also included within the charge chamber 338. In another, alternative embodiment, a projectile, such as described above with reference to FIG. 2, is included within the charge chamber.

The initiator canister 330 is in discharge alignment with the body opening 320. The initiator canister 330 includes a charge holder 346 which is used to direct and/or focus the discharge of reaction products resulting from the exothermic reaction upon actuation of the reactive charge 339 toward the first end opening 320. The initiator canister 330 includes conductive pins 350 and 352, respectively, in actuating communication with the reactive charge 339.

The body 312 includes at least two gas exit holes 360 positioned radially relative to the longitudinal axis 344 of the initiator canister 330. The position of the gas exit holes 360 in the body 312 create a thrust neutral gas exit area. The gas exit holes 360 are in gas flow communication with the gas flow space 342, thereby allowing inflation gas in the gas flow space 342 to exit the gas exit holes 360.

An interface portion 380 joins the initiator canister 330 to the body 312 to form the integral initiator assembly 310. The interface portion 380 can include any interface portion material described above, such as an injection-molded thermoplastic material. The body 312 includes a mating interface 384 at the body second end 316 containing at least a portion of the conductive pins 350 and 352.

The gas storage housing 390 is attached to the body first end 314 with a rupturable disk 370 covering the opening 320. The gas storage housing 390 includes a one-piece, generally elongated cylindrical chamber body 398, preferably a seamless tube, open at each end and welded to a chamber plug 399 at an end of the chamber body 398 opposite the end attached to the integral initiator assembly 310. The chamber plug includes a fill port 394 appropriately blocked or plugged by a pin or ball 396.

Figure 5:
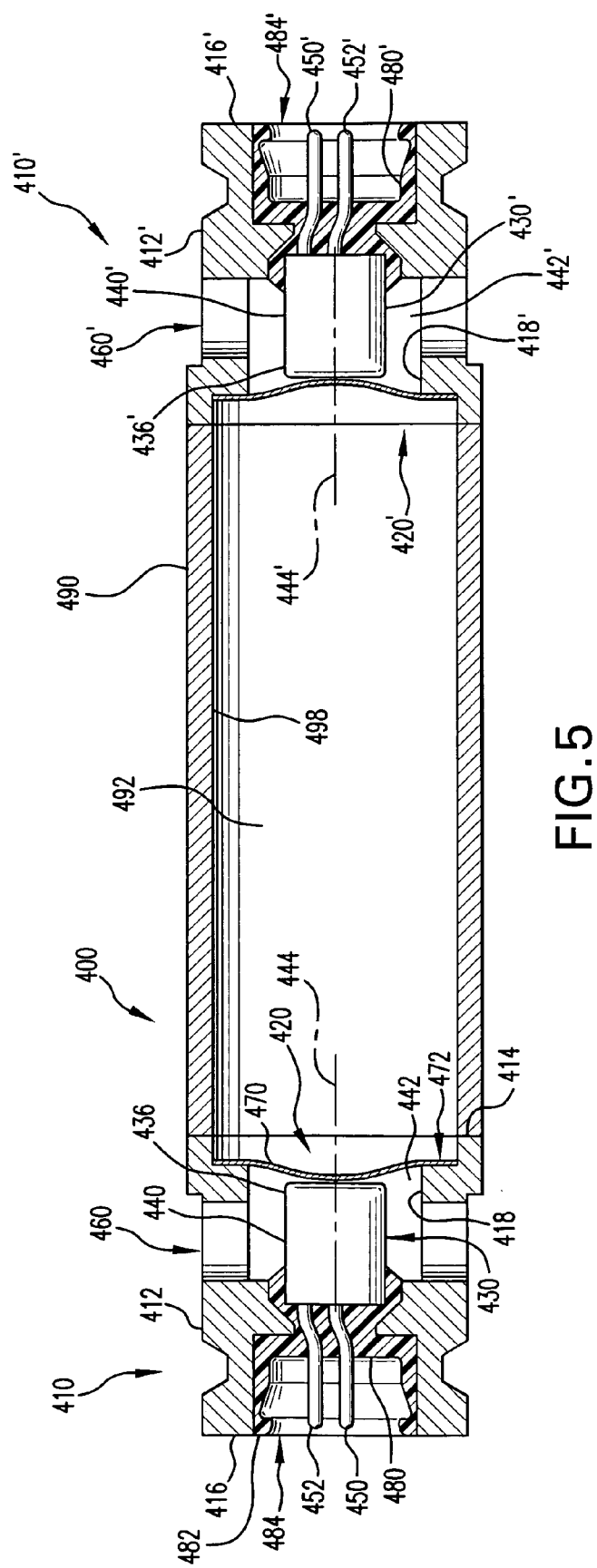
FIG. 5 shows a partial cross-sectional view of an inflator device in accordance with yet another preferred embodiment of the invention.

FIG. 5 illustrates an inflator device, generally designated by the reference numeral 400 and such as can desirably be employed in curtain inflatable restraint installations or other overhead inflatable restraint installations. The inflator device 400 includes a first integral initiator assembly 410, such as the integral initiator assembly described above and shown in FIG. 1, attached to one end of a gas storage housing 490 and a second, identical integral initiator assembly 410' attached to the other end of the gas storage housing 490. The inflator device 400 is desirable for installations where a relatively thin, more elongated inflator device may be desired due to installation area size restraints. Using two integral initiator assemblies, one at each end, the inflation gas in gas storage chamber 492 can exit the inflator device at an increased rate over similar sized inflator device with only one integral initiator assembly at one end of the gas storage housing. Reactive charges within the two initiator canisters of the inflator device can be actuated at substantially the same time or at predetermined intervals, thereby allowing for adaptive airbag inflation rates.

As shown in FIG. 5, the integral initiator assembly 410 and the integral initiator assembly 410' are identical. The integral initiator assemblies will be described below with reference only to integral initiator assembly 410. The integral initiator assembly 410' includes identical components as described for integral initiator assembly 410. The identical components of integral initiator assembly 410' are designated in FIG. 5 by the reference number of the integral initiator assembly 410 with the addition of an "'".

The integral initiator assembly 410 includes a body 412 having a first end 414 and a second end 416 opposite the first end 414. The body 412 has an inside surface 418. The first end 414 includes an opening 420. An initiator canister 430, such as, for example, described above, is joined to the body 412. The initiator canister 430 includes an initiator cap 436 having an outside surface 440 with at least a portion of the outside surface 440 separated from the inside surface 418 of the body 412, creating a gas flow space 442. At least one actuatable reactive charge (not shown) is disposed within the initiator canister 430 and, upon actuation by an electrical current through conductive pins 450 and 452, the reactive charge will at least produce heat, and desirably some gas as well. The reactive charge can be any reactive charge material described herein. A gas generant or a projectile, such as described above, can also be included within the initiator canister 430.

The initiator canister 430 is in discharge alignment with the body opening 420. The discharge of reaction products resulting from the exothermic reaction upon actuation of the reactive charge is directed and/or focused toward the first end opening 420.

The body 412 includes at least two gas exit holes 460 positioned radially relative to the longitudinal axis 444 of the initiator canister 430. The position of the gas exit holes 460 in the body 412 create a thrust neutral gas exit area. The gas exit holes 460 are in gas flow communication with the gas flow space 442, thereby allowing inflation gas in the gas flow space 442 to exit the gas exit holes 460.

An interface portion 480 joins the initiator canister 430 to the body 412 to form the integral initiator assembly 410. The interface portion 480 can include any interface portion material described above, such as an injection-molded thermoplastic material. The body 412 includes a mating interface 484 at the body second end 416 containing at least a portion of the conductive pins 450 and 452.

The gas storage housing 490 is attached to the body first end 414 with a rupturable disk 470 covering the opening 420. The gas storage housing 490 includes a one-piece, generally elongated cylindrical chamber body 498, preferably a seamless tube, open at each end. The first integral initiator assembly 410 is attached at one end of the chamber body 498 and the second integral initiator assembly 410' is attached at the opposite end of the chamber body 498 from the first integral initiator assembly 410.

Figure 6:
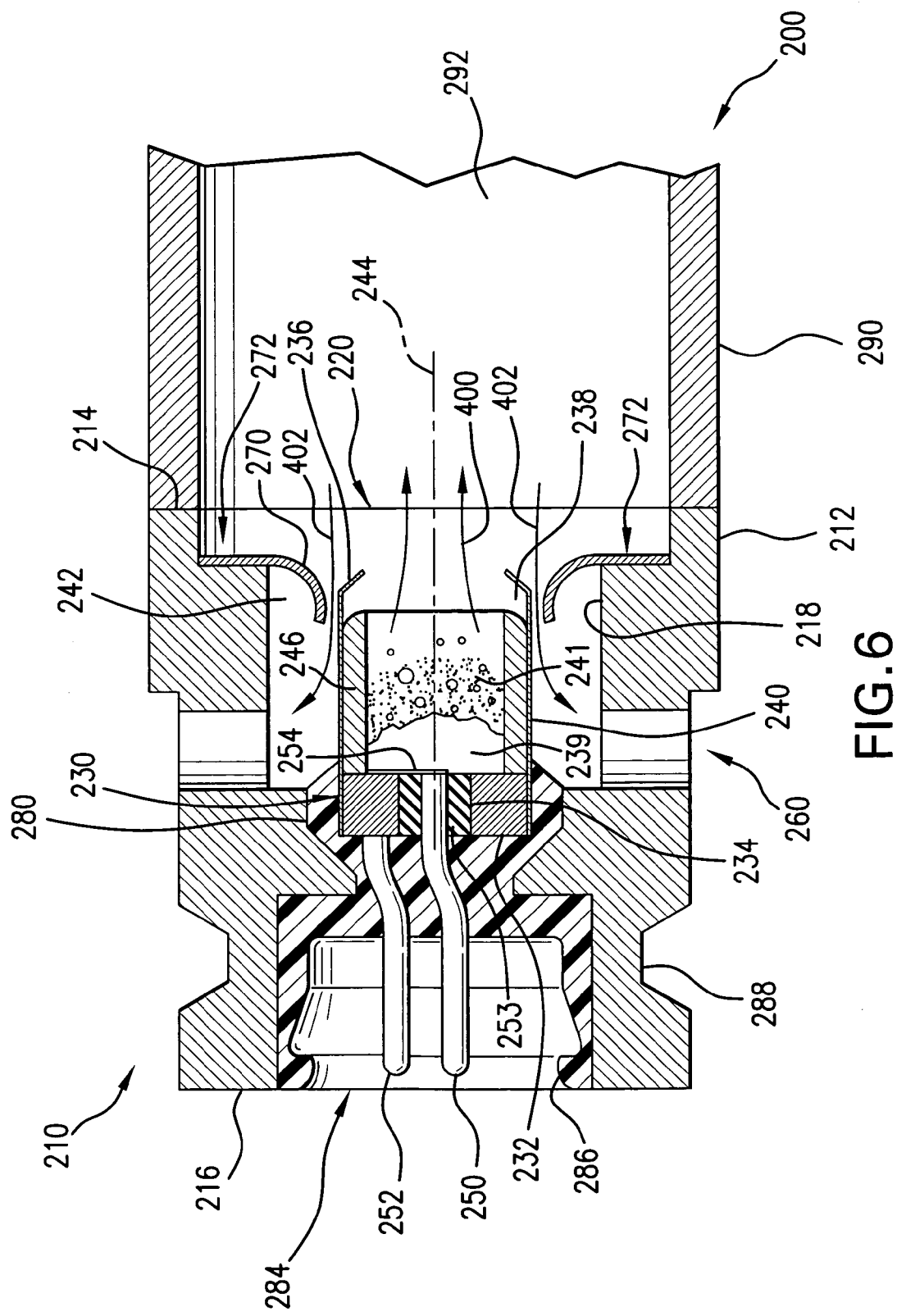
FIG. 6 shows a partial cross-sectional view of a portion of the inflator device of FIG. 3 during activation of the inflator device and during initial release of the stored, pressurized gas from the inflator device.

The general operation of an inflator device of this invention is shown in FIG. 6, with particular reference to the inflator device 200 of FIG. 3. As will be appreciated by one skilled in the art, the general operation of the inflator device 200 shown in FIG. 6 can be generally descriptive of the operation of other embodiments of this invention as well. Upon sensing a condition calling for inflation of an airbag, a sensor (not shown) will send a signal, e.g., an electric current, through the electrical connectors 250 and 252, which actuates the reactive charge 239. The reaction products resulting from the exothermic reaction of the actuated reactive charge 239 (indicated by arrows 400) rupture the initiator cap 236 and the rupturable disk 270. The reaction products of the actuated reactive charge 239 include at least heat, and preferably include gas as well. The heat from the reacting reactive charge 239 actuates a gas generant material 241, thereby resulting in the production of gas. The force resulting from the exothermic reaction of reactive charge 239, as well as the increase in temperature and pressure inside the charge chamber 238, is directed toward the first end opening 220 and first ruptures the initiator cap 236 and subsequently the rupturable disk 270. In another embodiment which includes a projectile within the charge chamber, the reaction upon actuation of the reactive charge, and optionally a gas generant material, propels the projectile through both the initiator cap and the rupturable disk.

Rupture of the rupturable disk 270 causes the pressurized inflation gas stored in the gas storage chamber 292 to immediately flow (indicated by arrows 402) out of the gas storage chamber 292 through the ruptured rupturable disk 270 into the gas flow space 242 and out the gas exit holes 260. When using a projectile to rupture the rupturable disk, the projectile is desirably sized to not fit within the gas flow space or out through the gas exit holes.

Thus, the invention provides an integral initiator assembly which can be attached to a gas storage housing to form an inflator device. The simplified one-piece construction of the integral initiator assembly of this invention provides the function of multi-component initiator assemblies such as are known in the art for use with inflator devices. The integral initiator assembly of this invention also requires fewer production steps and materials to provide an initiator assembly to perform such desired functions. The integral initiator assembly of this invention can be attached to a gas storage housing such as may have various sizes and shapes to provide multiple configurations of inflator devices for various designed inflatable restraint installations using a single initiator assembly design. In addition, the integral initiator assembly of this invention can be easily configured as either a blow down or direct opening inflator device depending on need.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An initiator assembly comprising:
    a body having a first end, a second end opposite the first end, and an inside surface, the first end including an opening;
    an initiator canister joined to the body, the initiator canister including a header body forming an eyelet and an initiator cap connected to the header body and defining a charge chamber, the initiator cap having an outside surface with at least a portion of the outside surface separated from the body inside surface by a gas flow space, the initiator canister having a longitudinal axis extending substantially perpendicular to the first end opening wherein the initiator cap is in discharge alignment with the first end opening;
    a reactive charge disposed within the charge chamber;
    a conductive pin positioned within the eyelet, the conductive pin in actuating communication with the reactive charge;
    an interface material in direct contact with th initiator canister and the body, the interface material joining the initiator canister to the body; and
    the body having a thrust neutral gas exit area including at least two gas exit holes in the body and positioned radially relative to the longitudinal axis of the initiator canister, the gas exit holes in gas flow communication with the gas flow space to allow inflation gas to exit the gas exit holes;
    additionally comprising a projectile within the charge chamber, wherein the projectile is in direct contact with the reactive charge and is propelled in the direction of the first end opening upon actuation of the reactive charge.

2. The initiator assembly of claim 1 additionally comprising a charge holder within the charge chamber.

3. An initiator assembly comprising:
    a body having a first end, a second end opposite the first end, and an inside surface, the first end including an opening;
    an initiator canister joined to the body, the initiator canister including a header body forming an eyelet and an initiator cap connected to the header body and defining a charge chamber, the initiator cap having an outside surface with at least a portion of the outside surface separated from the body inside surface by a gas flow space, the initiator canister having a longitudinal axis extending substantially perpendicular to the first end opening wherein the initiator cap is in discharge alignment with the first end opening;
    a reactive charge disposed within the charge chamber;
    a conductive pin positioned within the eyelet, the conductive pin in actuating communication with the reactive charge;
    an interface material in direct contact with the initiator canister and the body, the interface material joining the initiator canister to the body; and
    the body having a thrust neutral gas exit area including at least two gas exit holes in the body and positioned radially relative to the longitudinal axis of the initiator canister, the gas exit holes in gas flow communication with the gas flow space to allow inflation gas to exit the gas exit holes;
    wherein the interface material comprises an injection-molded material joining the initiator canister to the body to form the initiator assembly.

4. The initiator of claim 3 additionally comprising a mating interface at the body second end, the mating interface containing at least a portion of the conductive pin.

5. The initiator assembly of claim 4 wherein the injection-molded material adapts the mating interface to match an electrical connector.

6. An initiator assembly comprising:
    a body having a first end, a second end opposite the first end, and an inside surface, the first end including an opening;
    an initiator canister joined to the body, the initiator canister including a header body forming an eyelet and an initiator cap connected to the header body and defining a charge chamber, the initiator cap having an outside surface with at least a portion of the outside surface separated from the body inside surface by a gas flow space, the initiator canister having a longitudinal axis extending substantially perpendicular to the first end opening wherein the initiator cap is in discharge alignment with the first end opening;
    a reactive charge disposed within the charge chamber;
    a conductive pin positioned within the eyelet, the conductive pin in actuating communication with the reactive charge;
    an interface material in direct contact with the initiator canister and the body, the interface material joining the initiator canister to the body; and
    the body having a thrust neutral gas exit area including at least two gas exit holes in the body and positioned radial relative to the longitudinal axis of the initiator canister, the gas exit holes in gas flow communication with the gas flow space to allow inflation gas to exit the gas exit holes;
    wherein the initiator canister is joined to the body through melt-bonding.

7. The initiator assembly of claim 6 additionally comprising a gas generant material within the charge chamber.

8. The initiator assembly of claim 6 additionally comprising a rupturable disk at the body first end and sealing the opening.

9. The initiator assembly of claim 8 additionally comprising a stepped inner rim at the body first end, wherein the rupturable disk is attached to a surface of the stepped inner rim.

10. An initiator assembly comprising:
    a body having a first end, a second end opposite the first end, and an inside surface, the first end including an opening;
    an initiator canister joined to the body, the initiator canister including a header body forming an eyelet and a metal initiator cap connected to the header body and defining a charge chamber, the initiator cap having an outside surface with at least a portion of the outside surface separated from the body inside surface by a gas flow space, the initiator canister having a longitudinal axis extending substantially perpendicular to the first end opening wherein the initiator cap is in discharge alignment with the first end opening;

a reactive charge disposed within the charge chamber;

a conductive pin positioned within the eyelet, the conductive pin in actuating communication with the reactive charge;

a thermoplastic injection-molded material surrounding at least a portion of the initiator canister and joining the initiator canister to the body to form an initiator assembly; and the body having a thrust neutral gas exit area including at least two gas exit holes in the body and positioned radially relative to the longitudinal axis of the initiator canister, the gas exit holes in gas flow communication with the gas flow space to allow inflation gas to exit the gas exit holes.

11. The initiator assembly of claim 10 additionally comprising a gas generant material within the charge chamber.

12. The initiator assembly of claim 10 additionally comprising a projectile within the charge chamber, wherein the projectile is propelled in the direction of the first end opening upon actuation of the reactive charge.

13. The initiator assembly of claim 12 further comprising a charge holder within the charge chamber.

14. The initiator assembly of claim 10 additionally comprising a rupturable disk at the body first end and sealing the opening.

15. The initiator assembly of claim 14 additionally comprising a stepped inner rim at the body first end, wherein the rupturable disk is attached to a surface of the stepped inner rim.

16. The initiator assembly of claim 14 additionally comprising a gas storage housing attached to the body, wherein the gas storage housing in combination with the rupturable disk encloses an inflation gas storage chamber including inflation gas.

17. The initiator assembly of claim 10 additionally comprising a mating interface at the second end of the body, the mating interface containing at least a portion of the conductive, pin, wherein the injection-molded material adapts the mating interface to match an electrical connector.

18. An inflator device comprising:

an initiator assembly comprising;

a body having a first end, a second end opposite the first end, and an inside surface, the first end including an opening;

an initiator canister joined to the body, the initiator canister including a header body forming an eyelet and an initiator cap connected to the header body and defining a charge chamber, the initiator cap having an outside surface with at least a portion of the outside surface separated from the body inside surface by a gas flow space, the initiator canister having a longitudinal axis extending substantially perpendicular to the first end opening wherein the initiator cap is in discharge alignment with the first end opening;

a reactive charge disposed within the charge chamber;

a conductive pin positioned within the eyelet, the conductive pin in actuating communication with the charge;

an injection-molded material surrounding at least a portion of the initiator canister, the injection-molded material in direct contact with the initiator canister and the body and joining the initiator canister to the body; and the body having a thurst neutral gas exit area including at least two gas exit holes in the body and positioned radially relative to the longitudinal axis of the initiator canister, the gas exit holes in gas flow communication with the gas flow space to allow inflation gas to exit the gas exit holes;

a rupturable disk at the body first end and sealing the opening; and a gas storage housing attached to the body, wherein the gas storage housing in combination with the rupturable disk forms a gas storage chamber;

wherein the rupturable disk is raptured upon actuation of the reactive charge and the inflation gas exits the inflation device through the gas exit holes.

19. The inflator device of claim 18 additionally comprising a gas generant material within the charge chamber.

20. The inflator device of claim 18 additionally comprising a projectile within the charge chamber, wherein the projectile is propelled through the rupturable disk upon actuation of the reactive charge.

21. The inflator device of claim 18 comprising a first and a second of the initiator assemblies, wherein the first initiator assembly is attached to a first end of the gas storage housing via said body and the second initiator assembly is attached to a second end of the gas storage housing.

* * * * *